US012767086B2

(12) United States Patent
Acker et al.

(10) Patent No.: US 12,767,086 B2
(45) Date of Patent: Oct. 20, 2026

(54) VEHICLE OCCUPANT PROTECTION SYSTEM AND METHOD FOR ACTIVATING A VEHICLE OCCUPANT PROTECTION SYSTEM

(71) Applicant: ZF AUTOMOTIVE GERMANY GMBH, Alfdorf (DE)

(72) Inventors: Dominique Acker, Gschwend (DE); Gerd Zischka, Schwabisch Gmünd (DE); Marco Wahl, Sulzbach-Laufen (DE); Tillmann Herwig, Stuttgart (DE); Markus Feil, Urbach (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/248,066

(22) PCT Filed: Oct. 5, 2021

(86) PCT No.: PCT/EP2021/077432
§ 371 (c)(1),
(2) Date: Apr. 6, 2023

(87) PCT Pub. No.: WO2022/073997
PCT Pub. Date: Apr. 14, 2022

(65) Prior Publication Data

US 2023/0365096 A1 Nov. 16, 2023

(30) Foreign Application Priority Data

Oct. 8, 2020 (DE) ..................... 10 2020 126 393.7

(51) Int. Cl.
*B60R 21/268* (2011.01)
*B60R 21/217* (2011.01)
*B60R 21/26* (2011.01)

(52) U.S. Cl.
CPC ........ *B60R 21/268* (2013.01); *B60R 21/2171* (2013.01); *B60R 21/26* (2013.01);
(Continued)

(58) Field of Classification Search
CPC . B60R 21/213; B60R 21/217; B60R 21/2171; B60R 21/23138; B60R 21/268;
(Continued)

(56) References Cited

U.S. PATENT DOCUMENTS 3,741,584 A * 6/1973 Arai ...................... B60R 21/268 137/51
4,275,901 A * 6/1981 Okada ..................... B60R 21/30 280/741
(Continued)

FOREIGN PATENT DOCUMENTS

CN 101746342 A * 6/2010 ........... B60R 21/213
CN 111660994 A * 9/2020 ............. B60R 21/01
(Continued)

OTHER PUBLICATIONS

PCT International Search Report for corresponding International Application Serial No. PCT/EP2021/077432, mailed Jan. 19, 2022, pp. 1-5.

*Primary Examiner* — Timothy Wilhelm
(74) *Attorney, Agent, or Firm* — Tarolli, Sundheim, Covell & Tummino LLP

(57) ABSTRACT

In a vehicle occupant protection system, a gas generator assembly (12) comprises at least one separate support (24) mountable to the vehicle and at least two gas generators (16, 18) which are tightly mounted on the support (24). A control unit (22) determines the times of activation of the at least two gas generators (16, 18) simultaneously or time-delayed in order to be able to activate one of the gas generators (16, 18) already in advance of a possibly imminent crash situa-
(Continued)

tion so that the airbag (14) is filled in such a way that it starts an interaction with an associated vehicle occupant which moves the vehicle occupant by a predetermined distance.

12 Claims, 5 Drawing Sheets

(52) U.S. Cl.
CPC ............... *B60R 2021/26058* (2013.01); *B60R 2021/2685* (2013.01)

(58) Field of Classification Search
CPC .. B60R 2021/26058; B60R 2021/2685; B60R 21/013; B60R 21/0134; B60R 21/276; B60R 21/239
See application file for complete search history.

(56) References Cited

U.S. PATENT DOCUMENTS

| | | | | | |
|---|---|---|---|---|---|
| 4,919,897 | A * | 4/1990 | Bender | B60R 21/2644 | 422/165 |
| 5,556,128 | A * | 9/1996 | Sinnhuber | B60R 21/23138 | 280/739 |
| 5,593,180 | A * | 1/1997 | Cuevas | B60R 21/268 | 222/3 |
| 5,658,010 | A * | 8/1997 | Steffens, Jr. | B60R 21/203 | 280/741 |
| 5,899,488 | A * | 5/1999 | Muller | B60R 21/2165 | 280/732 |
| 5,992,878 | A * | 11/1999 | Narita | B60R 21/207 | 280/730.2 |
| 6,036,222 | A * | 3/2000 | Holmes | B60R 21/2171 | 280/736 |
| 6,142,519 | A * | 11/2000 | Smith | B60R 21/2644 | 280/741 |
| 6,168,200 | B1 * | 1/2001 | Greist, III | B60R 21/272 | 280/736 |
| 6,217,066 | B1 * | 4/2001 | Coleman | B64D 25/00 | 280/742 |
| 6,669,226 | B2 * | 12/2003 | Fowler | B60R 21/233 | 280/743.2 |
| 6,886,856 | B2 * | 5/2005 | Canterberry | B60R 21/2644 | 280/741 |
| 7,192,052 | B2 * | 3/2007 | Smith | B60R 21/26 | 280/741 |
| 7,306,257 | B2 * | 12/2007 | Yoshikawa | B60R 21/2171 | 280/728.2 |
| 7,487,996 | B2 * | 2/2009 | Katsuda | B60R 21/268 | 280/741 |
| 7,681,907 | B2 * | 3/2010 | Svenbrant | B60R 21/233 | 280/730.2 |
| 8,393,640 | B2 * | 3/2013 | Borg | B60R 21/0134 | 280/736 |
| 8,505,963 | B1 * | 8/2013 | Lewis | B60R 21/2171 | 280/741 |
| 8,596,675 | B2 * | 12/2013 | Kwon | B60R 21/207 | 280/730.2 |
| 8,702,123 | B2 * | 4/2014 | Mazanek | B60R 21/231 | 280/730.2 |
| 8,827,308 | B1 * | 9/2014 | Lewis | B60R 21/263 | 280/736 |
| 9,296,352 | B2 * | 3/2016 | Fujiwara | B60N 2/68 | |
| 9,399,441 | B2 * | 7/2016 | Jaradi | B60R 21/0136 | |
| 9,969,351 | B2 * | 5/2018 | Ohno | B60R 21/23138 | |
| 10,118,582 | B2 * | 11/2018 | Patel | B60R 21/239 | |
| 10,377,337 | B2 * | 8/2019 | Kunisada | B60R 21/207 | |
| 10,493,940 | B2 * | 12/2019 | Sugishima | B60R 21/233 | |
| 11,148,626 | B2 * | 10/2021 | Choi | B60R 21/013 | |
| 2002/0027339 | A1 * | 3/2002 | Breed | B60N 2/02246 | 280/730.2 |
| 2003/0141703 | A1 * | 7/2003 | Fowler | B60R 21/2171 | 280/728.2 |
| 2004/0046369 | A1 | 3/2004 | Michael et al. | | |
| 2005/0062272 | A1 * | 3/2005 | Smith | B60R 21/26 | 280/741 |
| 2005/0156411 | A1 * | 7/2005 | Steffens | B60R 21/0136 | 280/729 |
| 2010/0164210 | A1 * | 7/2010 | Sugimoto | B60R 21/207 | 280/741 |
| 2011/0006507 | A1 * | 1/2011 | Fukawatase | B60R 22/12 | 280/733 |
| 2016/0355152 | A1 * | 12/2016 | Perez Garcia | B60R 21/2338 | |
| 2017/0120859 | A1 * | 5/2017 | Ohno | B60R 21/263 | |
| 2018/0281730 | A1 * | 10/2018 | Nagasawa | B60N 2/75 | |
| 2019/0071045 | A1 | 3/2019 | Özyürek et al. | | |
| 2020/0254953 | A1 * | 8/2020 | Jessup | B60R 22/26 | |
| 2023/0303020 | A1 * | 9/2023 | Tenkap Mfoubi | B60R 21/013 | |
| 2024/0051488 | A1 * | 2/2024 | Yamazaki | B60R 21/017 | |

FOREIGN PATENT DOCUMENTS

| | | | | |
|---|---|---|---|---|
| DE | 19541513 | A1 | 11/1995 | |
| DE | 19811180 | A1 | 3/1998 | |
| DE | 60305218 | T2 | 3/2007 | |
| DE | 102007044824 | A1 | 4/2009 | |
| DE | 102009012364 | A1 * | 9/2010 | B60R 21/2171 |
| DE | 102009002922 | A1 * | 11/2010 | B60R 21/23138 |
| DE | 102017002259 | A1 * | 9/2018 | |
| DE | 102018220480 | A1 | 5/2020 | |
| DE | 102020004920 | A1 * | 10/2020 | B60R 21/013 |
| EP | 2106942 | A1 | 12/2010 | |
| KR | 0128846 | Y1 * | 12/1998 | |
| WO | 00/32448 | A1 | 6/2000 | |
| WO | 2005/075260 | A1 | 8/2005 | |

* cited by examiner

VEHICLE OCCUPANT PROTECTION SYSTEM AND METHOD FOR ACTIVATING A VEHICLE OCCUPANT PROTECTION SYSTEM

RELATED APPLICATIONS

This application is a U.S. National Stage Application filed under 35 USC 371 claiming priority to Serial No. PCT/EP2021/077432, filed on 5 Oct. 2021; which claims priority from German Patent Application DE 10 2020 126 393.7, filed 8 Oct. 2020, the entireties of which are hereby incorporated herein by reference.

The invention relates to a vehicle occupant protection system comprising at least one airbag and to a method of activating a vehicle occupant protection system of this type.

There are known so-called two-stage gas generators comprising, in a single housing, two separately activatable propellants which, in a dangerous situation, are activated simultaneously or time-delayed in accordance with the current driving situation.

The amount of gas released by the individual stages must be defined in advance already at the beginning of the development of the gas generator and predefines plural parameters of the production line which cannot be altered in the course of production or can only be altered at high costs.

It is the object of the invention to improve the protection of a vehicle occupant by the released amounts of gas of the individual stages of a gas generator arrangement being adjustable more flexibly to varying requirements.

This object is achieved by a vehicle occupant protection system comprising at least one airbag which can be filled using a gas generator assembly, wherein the gas generator assembly comprises at least one separate support mountable on the vehicle and at least two gas generators being manufactured separately from each other and including a separate outer housing which are tightly mounted on the support, and wherein both gas generators supply filling gas individually and/or jointly for the same airbag. The vehicle occupant protection system further comprises a control unit that determines the times of activation of the at least two gas generators, with the times being determinable simultaneously or time-delayed.

Each of the gas generators forms so-to-speak one stage of a multi-stage filling system. Since, however, the individual gas generators are separately manufactured components which are separate from each other, any combination of different gas generators can be arranged. This enables to quickly change the amounts of gas and proportions to be generated, when the requirements to the vehicle occupant protection system vary, without the production line for the gas generator having to be adapted, because there can just be arranged a different and more suitable combination of already existing gas generators. In this way, easy adjustability to the particular load case for which the vehicle occupant protection system has to be designed can be achieved. The support is not the vehicle frame, but a part separate from the vehicle and adapted to be secured to the vehicle, so that positions can be easily adapted by modifying the support or the unit formed by the support can be prefabricated and attached later to the vehicle, specifically to a frame part.

Where necessary, the shape of the support can be adjusted to the different gas generator designs. Since the support is a relatively simple mechanical component having no separate pyrotechnical and electronic components, however, only little effort and low costs are involved in the adaptation of the manufacture.

The support can be made of an appropriate synthetic material or else of an appropriate metal, such as aluminum or steel.

There may be provided only one, but also two or more identically or differently shaped supports spaced apart from each other in a gas generator assembly. Generally, it may be advantageous to provide plural supports spaced apart in the longitudinal direction so as to increase the positional stability of the gas generator inside the gas generator assembly and, at the same time, to minimize the weight and the material costs.

As the gas generators are mounted on one or more joint support(s), moreover a compact unit which is easy to handle is resulting.

The control unit can basically actuate the gas generator assembly in an identical manner to a conventional multi-stage gas generator that includes plural separate igniters. The selection of the ignition times of the individual gas generators can be determined in any appropriate manner, wherein specifically a situational selection of the times in response to the current driving situation including a possibly imminent dangerous situation can be taken into consideration.

All gas generators of the gas generator assembly preferably are tubular gas generators which, when being installed in juxtaposition on the support, result in a compact gas generator assembly.

The support(s) should be specifically designed in such a way that the longitudinal directions of the at least two gas generators on the support have an angle ranging from 0° to 180°, specifically from 0° to 45°, with each other. The alignment of the individual gas generators on the support can be adjusted to the predefined mounting situation by the shape selected for the support.

In a preferred embodiment, the airbag which is filled via the gas generator assembly is a side airbag. Preferably, the gas generator assembly is mounted, just as the side airbag, on a seat frame of a vehicle seat.

In this mounting situation, it is favorable to mount two tubular gas generators parallel to or aligned at a small angle with each other on the support, as in a lower area, i.e., close to the vehicle floor, the side bolster of the seat frame is often configured to be relatively wide so that such a gas generator assembly can easily fit, while a single multi-stage gas generator having a large longitudinal extension would be more difficult to install.

For example, side bolsters frequently have different shapes over their longitudinal extension which are caused by beads or deep-drawn sections, for example, to impart the required rigidity to the seat frame. By appropriately shaped supports, the gas generator assembly can also be adjusted to those fitting positions. One of the gas generators could be located in a recessed bead, for example, and the gas generator juxtaposed on the support could be located on an elevated surface of the seat frame adjacent to the bead. This enables fitting positions which could not be used for conventional two-stage gas generators.

If it is more favorable as regards the mounting situation, the support can also be designed, of course, such that the gas generators can be installed successively at an angle of 180°, wherein the longitudinal axes of the gas generators may be located on a straight line or else offset against each other.

In general, each arrangement of the two gas generators useful for the respective mounting situation can be easily realized relative to each other via one or more appropriate supports so that also geometrically complex fitting positions can be used.

For the installation in the airbag, it is of advantage, however, when the igniters of all gas generators of the gas generator assembly are disposed as close to each other as possible so that the gas generator assembly can be sealed, just as in the case of use of one single gas generator, against an inflation mouth of the airbag and can be easily electrically contacted.

The position of the gas generators relative to each other is fixedly predefined by the respective shape of the support. Preferably, the gas generators are not provided to be mountable in different alignments on a predetermined support, but one or more specific support(s) is/are manufactured for each installation situation.

The support can be easily designed so that even gas generators having different diameters can be mounted to a support. It is possible, for example, to combine a gas generator having a diameter of 20 mm with a gas generator having a diameter of 25 mm.

In one possible configuration, the support has a central land including two concave seats provided on opposite sides of the central land, with one respective gas generator being inserted in each seat and the seats being adapted to the outer contour of the respective gas generator. The width of the central land defines the distance of the longitudinal axes of the gas generators from each other.

The radii of the two seats may be located on a straight line but may optionally also be offset against each other so that the position of the two gas generators relative to each other can be predetermined by the support while being adapted to the respective installation situation as desired.

In a possible variant, the seats are open to the side so that their inner contour describes a pitch circle and the gas generator can be inserted from the respective side.

In another possible variant, the seats are circumferentially closed so that the respective gas generator is surrounded by the wall of the seat. This variant is advantageous, for example, when the support is provided in the area of the igniters of the gas generators, as the support at the same time can constitute a sealing against the airbag.

Also, the support can simply be designed such that it forms an anti-twist protection for the gas generators so that the latter are prevented from rotating in the seats.

Each support generally can be formed in one piece or can be assembled of two or more components so as to facilitate positioning of the gas generators on the support.

The gas generator assembly may be fastened, for example, via fastening bolts provided on one of the gas generators to the vehicle, as is conventionally provided for individual gas generators.

As an alternative, it is also possible to provide on at least one of the supports a fastener via which the gas generator assembly is fixed on the vehicle so that the support can be mounted to the vehicle. The fastener may be, for example, one or more fastening bolts manufactured integrally with the support or suitably attached to the latter.

In order to fix the individual gas generators to the support, for example strips, specifically steel strips having an appropriate buckle may be provided which can be adapted to the size and the shape of the gas generator assembly by tensile force. Those strips are commercially available, e.g., by the brand name of Oetiker-Klemme® (clip) or Band-IT®.

Preferably, the support has an appropriate geometry to determine the position of one or more of those strips relative to the support and the gas generators. In this context, for example appropriate projections or recesses may be concerned between which or through which the respective strip extends.

In another variant, the support is welded to at least one of the gas generators and/or has at least one fastening hole that is aligned with a fixing element on a circumferential wall of one of the gas generators. For example, a fastening bolt provided on the gas generator may be used as a fixing element.

It is also possible to design the support so that it comprises a diffuser portion which, when mounting the gas generator assembly, comes to lie above the gas outlet openings of one of the gas generators and, thus, acts as a diffuser for said gas generator. In this case, too, fastening bolts provided on the respective gas generator can be used for fixation.

In particular in connection with autonomous driving, in vehicles more and more sensors for detecting the driving situations as well as potential hazardous situations imminent in the near future are installed. This sensor system can also be utilized for improving the safety of the vehicle occupants. It is possible, for example, to fill an airbag already in advance of a potential hazardous situation at least partly so as to make it available already early for the vehicle occupant. If then the hazardous situation really occurs, the airbag can be further filled so as to safely cushion the vehicle occupant.

For activating an afore-described vehicle occupant protection system, according to the invention the following steps are provided:

detecting a possibly imminent crash situation, activating one of the gas generators already in advance to the detected and possibly imminent crash situation so that the airbag is filled such that it will start interaction with an associated vehicle occupant which moves the vehicle occupant by a predetermined distance, and activating the other gas generator, if the crash situation really occurs.

The first one of the gas generators is activated already when the sensor system and the electronic systems of the control unit report that a crash situation might have to be expected (pre-crash-detection). The amount of filling gas of said gas generator has to be dimensioned so that the airbag is filled already up to a volume sufficient to interact with the vehicle occupant, but not yet up to the complete filling volume and/or internal pressure.

Accordingly, it is intended to make the vehicle occupant associated with the airbag already contact the filling airbag and, preferably, to move him/her somewhat out of the hazardous zone, or to position the vehicle occupant in an appropriate position for a collision.

If the crash situation does not occur, the introduced filling gas escapes through vent holes of the airbag and the second one of the gas generators is not activated.

If, however, the crash situation occurs, also the second one of the gas generators is activated at a suitable time determined by the control unit and the airbag is inflated up to its maximum intended filling volume and the required internal pressure and cushions the immersing vehicle occupant.

As a matter of course, also all other activation variants which basically can be configured with a two- or multi-stage gas generator can be implemented by the gas generator assembly. These include, for example, restraining a particularly light or particularly heavy vehicle occupant or a vehicle occupant who, due to sitting positions enabled during autonomous driving, for example, is not sitting in an optimum restraining position (out-of-position).

Although the invention has been described for exactly two gas generators in the gas generator assembly here, it is possible, as a matter of course, to combine even a larger number of gas generators in a gas generator assembly.

In the following, the invention shall be described in greater detail by means of plural embodiments with reference to the attached drawings, wherein.

Figure 1:
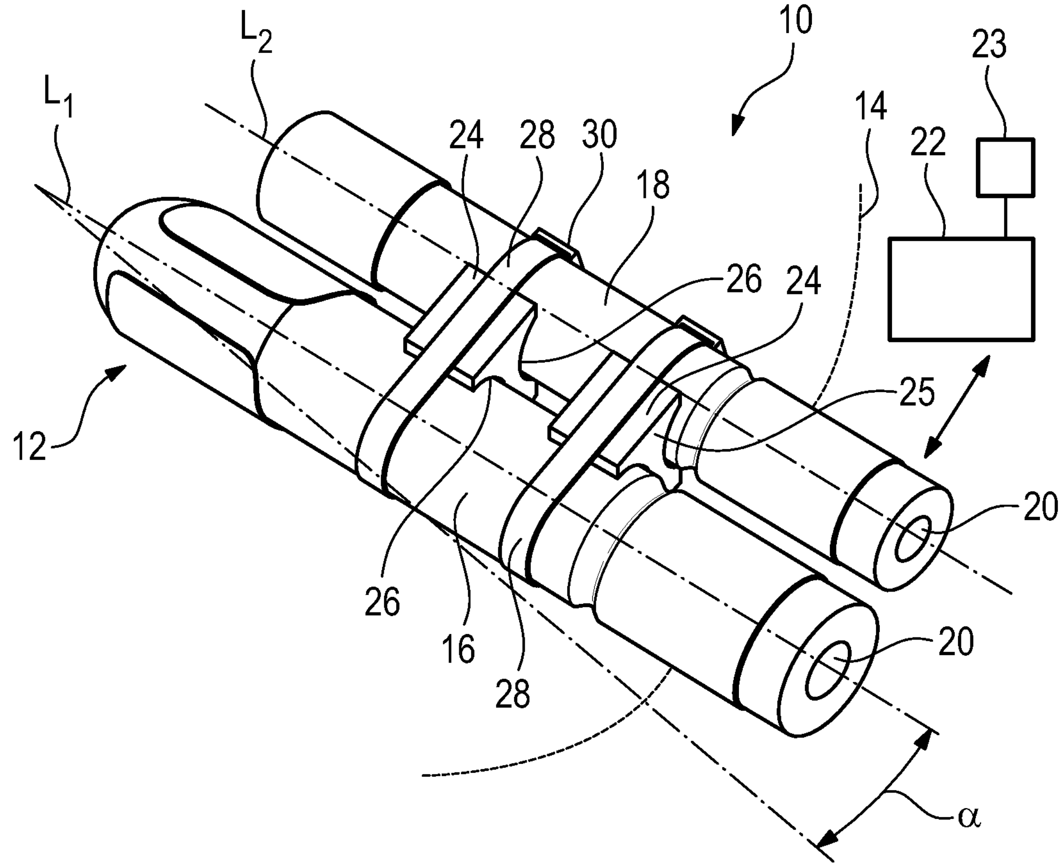
FIG. 1 shows a schematic perspective view of a gas generator assembly of a vehicle occupant protection system according to the invention as set forth in a first embodiment for carrying out a method according to the invention.

FIG. 1 illustrates a vehicle occupant protection system 10 comprising a gas generator assembly 12 supplying filling gas for an airbag 14 (indicated in FIG. 1).

The gas generator assembly 12 in this example comprises two individual gas generators 16, 18 manufactured separately from each other and each having a separate outer housing. Hereinafter, they will also be referred to as first and second gas generators 16, 18.

All gas generators 16, 18 of the gas generator assembly 12, more precisely the igniters 20 thereof, are connected to a control unit 22 that is designed to activate the gas generators 16, 18 by transmitting an electric signal to the igniters 20 thereof.

The gas outlet areas of all gas generators 16, 18 of the gas generator assembly 12 are located inside the airbag 14 and supply filling gas for said airbag 14.

The control unit 22 is designed so that it presets the activation times of the two gas generators 16, 18 individually, wherein the times can be fixed simultaneously or time-delayed and can also be determined depending on a current driving situation of the vehicle in which the vehicle occupant protection system 10 is installed.

The two gas generators 16, 18 in this case are tubular gas generators (i.e., gas generators the longitudinal extension of which along a longitudinal direction L1, L2 is larger than their diameter normal to said longitudinal direction). The gas generators 16, 18 can be identical or, as shown here, have different designs and, accordingly, can differ both by the amount of filling gas which they can provide and by their type, their length, their diameter, the arrangement of their gas outlet areas as well as other features.

The combination of the two gas generators 16, 18 is selected so that, with respect to their capacity, specifically their amount of filling gas, they allow a two-stage filling of the airbag 14 which is adapted to the vehicle conditions, for example concerning the position and the volume of the airbag 14 as well as the possible sitting positions of the vehicle occupant in a vehicle seat with which the airbag 14 is associated.

For example, the first gas generator 16 is designed so that it supplies a larger amount of filling gas than the second gas generator 18. In this example, the first gas generator 16 also has a larger diameter than the second gas generator 18, the diameters amounting to, e.g., 20 mm and 25 mm.

A possible scenario for activating the gas generators 16, 18 of the gas generator assembly 12 is as follows: Sensors 23 inside the vehicle which communicate with the control unit 22 provide information about a detected possibly imminent crash situation which might develop for the vehicle (so-called pre-crash detection).

Where necessary, further data are detected by other sensors, for example about a position of a vehicle seat and the backrest thereof and a current position of the vehicle occupant in the particular vehicle seat, and are equally transmitted to the control unit 22.

The control unit 22 determines proper times for the activation of the two gas generators 16, 18.

Initially, even before the crash situation actually occurs, the first gas generator 16 is activated so that the filling gas thereof inflates the airbag 14 up to a first volume. The airbag 14 gets in contact with and exerts a force upon the vehicle occupant, the force moving the vehicle occupant to an appropriate position and out of a dangerous zone. In so doing, the airbag 14 possibly is not inflated up to its maximum filling volume and/or internal pressure.

If the crash situation does not occur, the second gas generator 18 is not activated and the filling gas escapes through gas outlet openings (not shown) from the airbag 14.

If, however, a crash situation actually develops, upon occurrence of the crash situation also the second gas generator 18 is activated and the filling gas thereof is introduced to the airbag 14 so as to (re-) fill the airbag 14 up to the complete intended filling volume and/or internal pressure so that the vehicle occupant can be safely cushioned.

The gas generator assembly 12 can be used for this purpose like a conventional two-stage gas generator.

The two gas generators 16, 18 are mechanically interconnected in the gas generator assembly 12 via one or more supports 24. Here, two supports 24 are provided which are arranged spaced apart from each other along the longitudinal directions L1, L2 of the gas generators 16, 18.

Figure 2:
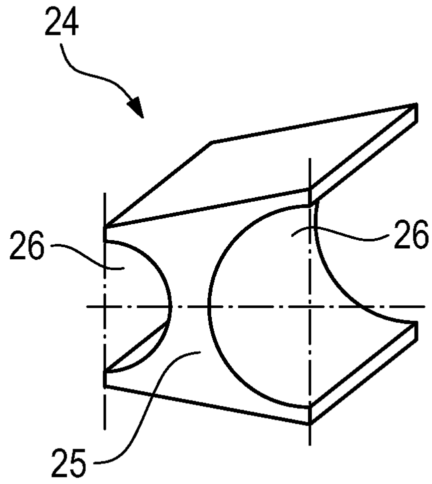
FIGS. 2 and 3 show different supports of the gas generator assembly of FIG. 1.
Figure 3:
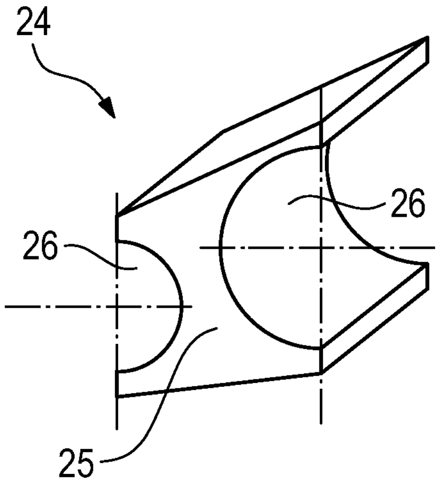

As shown in FIGS. 2 and 3, each of the supports 24 has a suitable shape adapted to the current installation situation in the vehicle. The support(s) 24 is/are made of a suitable synthetic material or metal and may have identical or different shapes.

In this embodiment, each of the supports 24 has a central land 25 at which a seat 26 is formed on each of opposite sides. Each of the seats 26 takes a concave shape and is adapted to the outer contour and, specifically, to the diameter of the respective gas generator 16, 18 which is laterally inserted in the seat 26.

The radii of the seats 26 may be located on a straight line (see FIG. 2) or may form straight lines offset against each other (see FIG. 3). This can be individually adjusted to the given installation situation.

In the example of FIG. 1, the two gas generators 16, 18 are disposed in the gas generator assembly 12 such that the longitudinal directions L1, L2 thereof are in parallel to each other. This is not mandatory, however. The longitudinal directions L1, L2 can also enclose an angle $\alpha$ between 0° and 180°, specifically between 0° and 45°, wherein the longitudinal directions L1, L2 need not essentially be located in the same plane.

The arrangement of the gas generators 16, 18 relative to each other is clearly predefined by the shape of the supports 24, particularly the position and the alignment of the seats 26.

For example, an irregularly shaped holding space in a side bolster can be utilized to arrange the gas generator assembly 12. In this case, the airbag 14 is a side airbag which deploys out of the backrest between the vehicle seat and, e.g., an outer wall of the vehicle.

In this example, the igniters 20 of both gas generators 16, 18 are close to each other and, with respect to the longitudinal directions L1, L2, also at the same position so as to facilitate both the electric contacting and the sealing against the airbag 14. This means that the shorter of the two gas generators, the gas generator 18 in this case, does not protrude as far into the airbag 14 as the gas generator 16 does.

Figure 4:
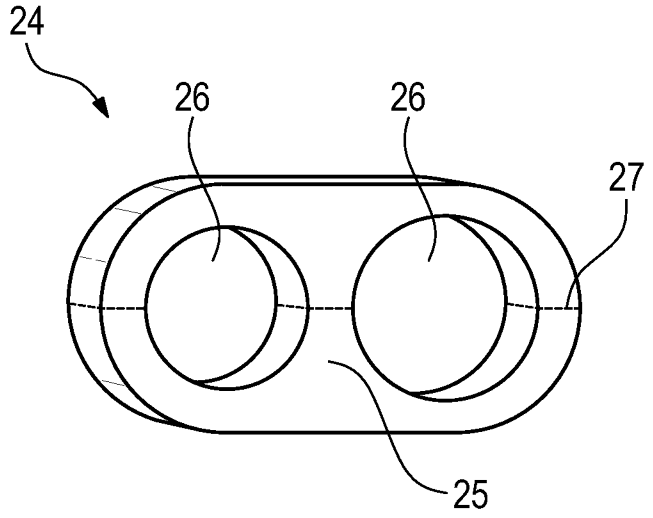
FIG. 4 shows a support of a gas generator assembly according to a further embodiment.
Figure 5:
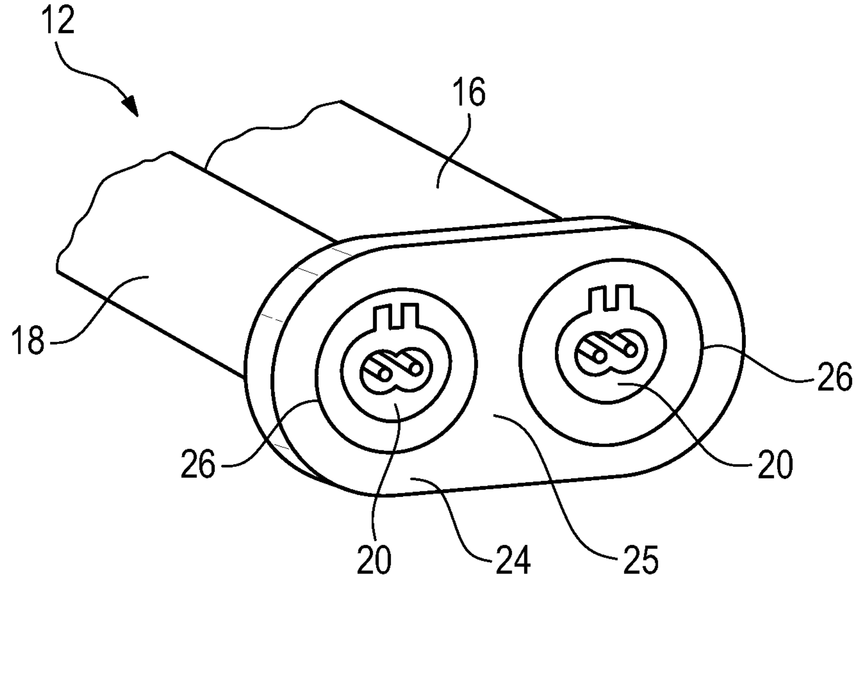
FIG. 5 shows the support of FIG. 4 comprising two gas generators inserted in the same.

FIGS. 4 and 5 illustrate an example of a support 24 in which the seats 26 are not open to the side, but are circumferentially closed so that they surround the complete circumference of the two gas generators 16, 18. Such support 24 is applied, for example, in the area of the igniter 20 (see FIG. 5) and, at the same time, can be used for sealing against an inflation mouth of the airbag 14.

The support 24 may be manufactured in one piece, with the gas generators 16, 18 being inserted into the respective seats 26 along their longitudinal directions L1, L2, or may consist of two parts, as indicated in FIG. 4, which are assembled around the gas generators 16, 18 at a parting line 27.

It is generally possible to freely combine all different supports 24 shown in a gas generator assembly 12 at a skilled person's discretion so as to obtain the desired arrangement of the two gas generators 16, 18 as well as a desired fixation on the vehicle.

Basically, it is also possible to design supports 24 which can combine three or more gas generators at the same time in one single gas generator assembly 12 to achieve a flexible multi-stage ignition behavior.

Inside the gas generator assembly 12, the gas generators 16, 18 and the supports 24 are held together by strips 28, for example (see FIGS. 1, 6 and 9), with one strip 28 being provided for each support 24. The strips 28 in this case are straps made of steel which are provided with a buckle 30 and which, after being tightened, retain the gas generators 16, 18 safely in their distinct position at the supports 24.

Figure 9:
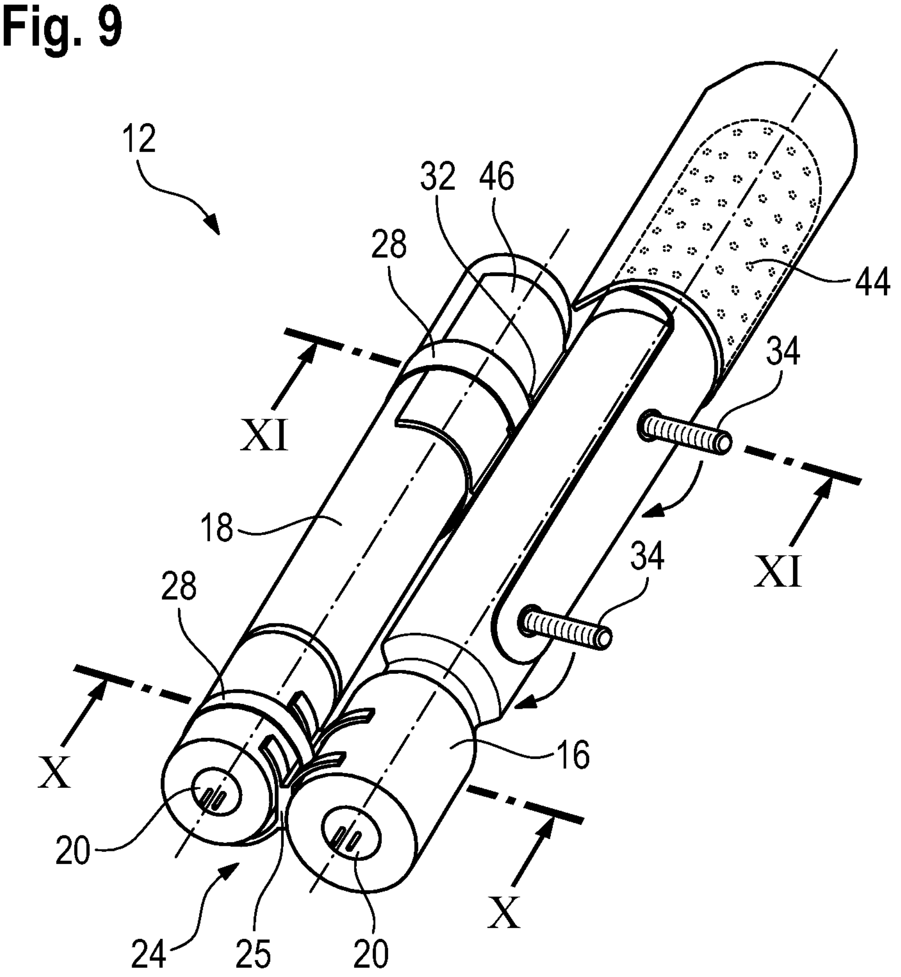
FIGS. 9 to 11 show schematic views of a gas generator assembly according to yet a further embodiment.

The supports 24 have suitable geometries, for example, to retain the strips 28 at the intended position (see recess 32 in FIG. 9, for example).

Figure 7:
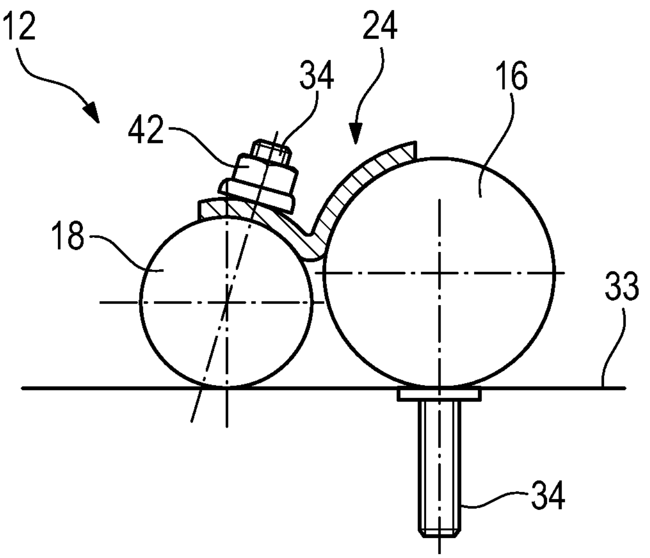
FIGS. 7 and 8 show schematic views of a gas generator assembly according to yet another embodiment.

For mounting the gas generator assembly 12 to the vehicle, such as to a seat frame 33 of a vehicle seat, for example fastening bolts 34 provided on one of the gas generators 16, 18 can be utilized, as this is conventionally done when mounting a single gas generator (indicated in FIG. 7).

Figure 6:
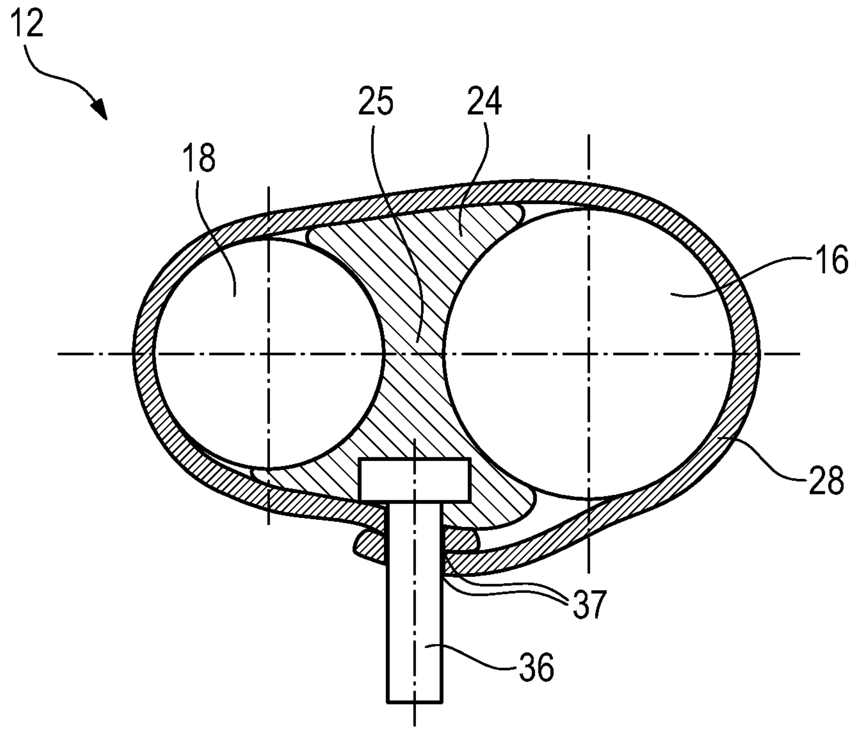
FIG. 6 shows a schematic sectional view of a gas generator assembly according to another embodiment.

FIG. 6 illustrates a variant in which a fastener 36 for mounting fixed to the vehicle, in this case a fastening bolt, is integrated in the support 24.

In this example, the fastener is also used for fixing the strip 28 to the support 24 by placing openings 37 in the end portions of the strip 28 over the fastening bolt.

Figure 8:
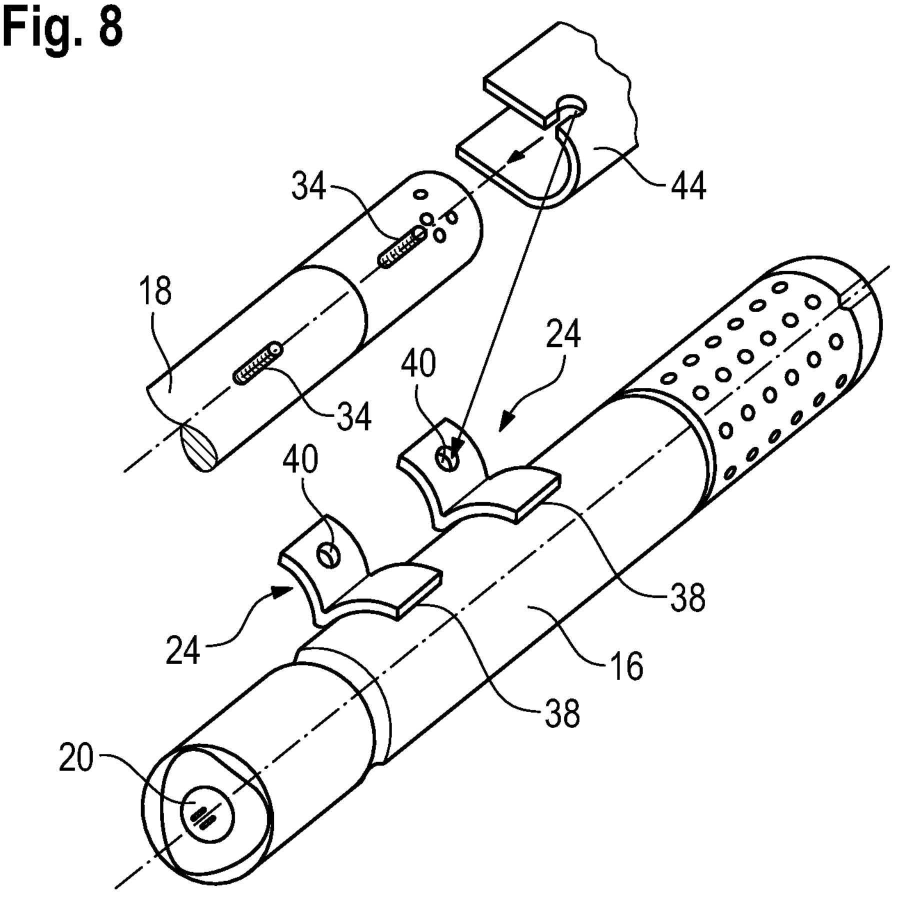

FIGS. 7 and 8 illustrate another variant of the supports 24. In this case, each of the supports 24 is made of a metal strip bent in V-shape the one end of which is tightly fixed to one of the gas generators, in this case the first gas generator 16, by a welded connection 38. The other end includes a fastening hole 40 through which one of the fastening bolts 34 of the second gas generator 18 is inserted and secured by a nut 42. In this example, the fastening bolts 34 of the first gas generator 16 are used to mount the gas generator assembly 12 to the vehicle (not shown).

FIG. 8 also shows that a diffuser 44 can equally be mounted to one of the fastening bolts 34 of the second gas generator 18.

Figure 10:
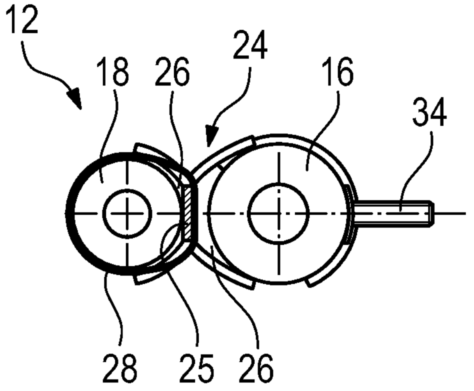
Figure 11:
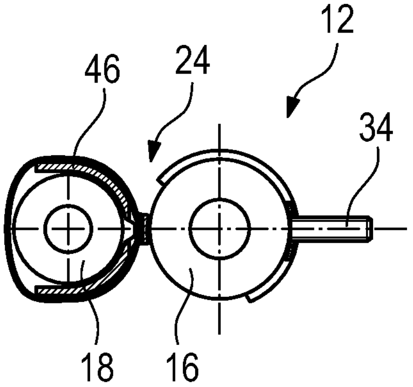

FIGS. 9 to 11 illustrate an embodiment in which a diffuser portion 46 for the second gas generator 18 is integrated in one of the supports 24.

FIG. 10 shows a section along the line X-X and FIG. 11 shows a section along the line XI-XI of FIG. 9.

In addition, a diffuser is mounted on the fastening bolts 34 of the first gas generator 16.

In this case, a respective strip 28 is utilized to fasten the second gas generator 18 to the support 24.

FIGS. 9 and 10 also illustrate the recess 32 for the strip 28 that connects the strip to the support 24 and secures it against displacement.

In this case, too, the fastening bolts 34 of the first gas generator 16 are used for fixing the gas generator assembly 12 to the vehicle.

The invention claimed is:

1. A system for helping to protect an occupant of a vehicle seat, comprising:

a side airbag configured to be mounted to a seat frame of the vehicle seat;

a gas generator assembly configured to produce a two-stage inflation of the side airbag, the gas generator assembly being configured to be mounted to the seat frame and to be positioned inside the side airbag when mounted to the seat frame, the gas generator assembly comprising first and second separate gas generators and a support to which the first and second gas generators are tightly mounted, the first and second gas generators being manufactured separately from each other and each comprising a housing including a gas outlet area, a propellant stored in the housing, and an igniter that is actuatable to ignite the propellant to cause a filling gas to be discharged from the gas outlet area directly into the side airbag, wherein the first and second gas generators are configured to supply, individually and/or jointly, the filling gas for filling the side airbag; and a control unit configured to control, individually, the igniter of the first gas generator and the igniter of the second gas generator so that the first and second-gas generators produce the two-stage inflation of the side airbag, wherein the control unit is configured to detect a possibly imminent crash situation, to activate the igniter of the first gas generator to produce a first stage of inflation of the side airbag in response to detecting the possibly imminent crash situation in advance of an occurrence of an actual crash, wherein the first gas generator is configured to deliver a first volume of filling gas, and the side airbag is configured such that, in response to receiving the first volume of filling gas, the side airbag initially deploys and interacts with and moves the occupant out of a dangerous zone prior to the occurrence of the actual crash;

wherein the control unit is configured to detect the occurrence of the actual crash and to activate the igniter of the second gas generator to produce a second stage of inflation of the side airbag in response to detecting that the possibly imminent crash situation has really occurred, wherein the second gas generator is configured to deliver a volume of filling gas sufficient to fully deploy the side airbag to a pressure and volume sufficient to cushion the occupant.

2. The vehicle occupant protection system according to claim 1, wherein the gas generator assembly further comprises a fastener configured to fix the gas generator assembly to the seat frame, wherein the fastener is provided on the first or second gas generator or on the support.

3. The vehicle occupant protection system according to claim 1, wherein the support includes a central land having two concave seats provided on opposite sides of the central land and facing concavely away from each other, with each of the first and second gas generators being inserted in one of the seats and the seats being adjusted to the outer contour of the respective gas generator.

4. The vehicle occupant protection system according to claim 3, wherein the first and second gas generators are biased toward each other into the seats.

5. The vehicle occupant protection system according to claim 4, further comprising a strap configured to encircle the two gas generators and the support, the strap being configured to bias the two gas generators toward each other into the seats.

6. The vehicle occupant protection system according to claim 5, wherein the seats are circumferentially closed and encircle the respective one of the first and second gas generators seated therein.

7. The vehicle occupant protection system according to claim 1, wherein the first and second gas generators are fixed to the support via straps.

8. The vehicle occupant protection system according to claim 1, wherein the support is welded to at least one of the first and second gas generators and/or includes at least one fastening hole which is aligned with a fixing element on a circumferential wall of one of the first and second gas generators.

9. The vehicle occupant protection system according to claim 1, wherein the support is designed such that longitudinal directions of the first and second gas generators on the support include an angle between 0° and 180° with each other.

10. The vehicle occupant protection system according to claim 1, wherein the support is designed such that longitudinal directions of the first and second gas generators on the support include an angle between 0° to 45° with each other.

11. The vehicle occupant protection system according to claim 1, wherein the propellant of the first gas generator is configured to fill the side airbag to a volume sufficient to interact and move the occupant out of the dangerous zone but not to the pressure and volume sufficient to cushion the occupant.

12. The vehicle occupant protection system according to claim 1, wherein the side airbag is configured to vent the filling gas if the actual crash does not occur.

* * * * *